(12) United States Patent
Hoshino et al.

(10) Patent No.: US 6,289,014 B1
(45) Date of Patent: Sep. 11, 2001

(54) MULTILINE-CORRESPONDENT CELL HEADER CONVERSION APPARATUS AND METHOD

(75) Inventors: Tadashi Hoshino; Hichiro Hayami; Naoki Aihara, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,946

(22) Filed: Sep. 2, 1998

(30) Foreign Application Priority Data

Mar. 19, 1998  (JP) .................................................. 10-070062

(51) Int. Cl.[7] .................................................. H04L 12/28
(52) U.S. Cl. .............................................. 370/392; 370/397
(58) Field of Search ..................................... 370/389, 392, 370/393, 395, 397, 399, 401, 409, 411, 428, 429, 466, 467, 476, 535; 340/825.02

(56) References Cited

U.S. PATENT DOCUMENTS 5,271,010 * 12/1993 Miyake et al. ....................... 370/94.1
5,701,300 * 12/1997 Jeon et al. ............................ 370/392
6,046,996 *  4/2000 Hoshino et al. ...................... 370/392
6,064,674 *  5/2000 Doidge et al. ....................... 370/398

FOREIGN PATENT DOCUMENTS 5-268241   10/1993  (JP) .

* cited by examiner

Primary Examiner—Alpus H. Hsu
Assistant Examiner—Duc Ho
(74) Attorney, Agent, or Firm—Helfgott & Karas, P.C.

(57) ABSTRACT

The first input route information with a virtual path identifier, a virtual channel identifier and a line identifier set in the header of an input cell is compressed, and a base address with a lower number of bits than the input route information is generated from a part of the second input route information selected by the compression using a first conversion table. Then, third data consisting of both the base address and a part of the second input route information other than the part of the second input route information selected by the compression are generated, and the third data are converted to a routing tag using a second conversion table.

20 Claims, 15 Drawing Sheets

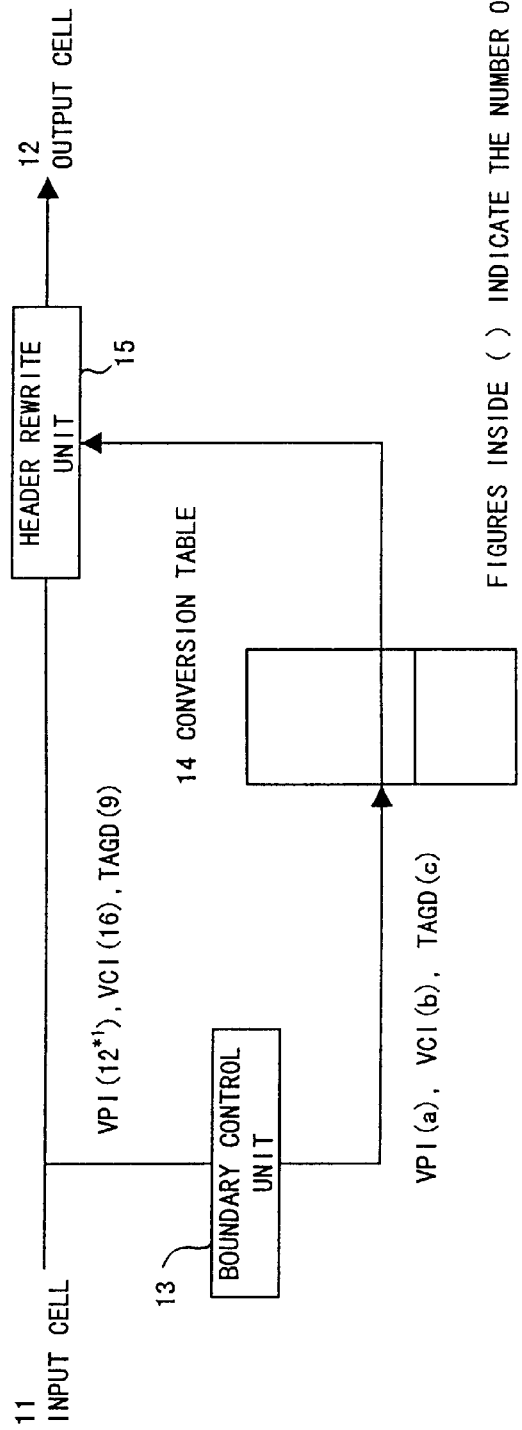
F I G. 1

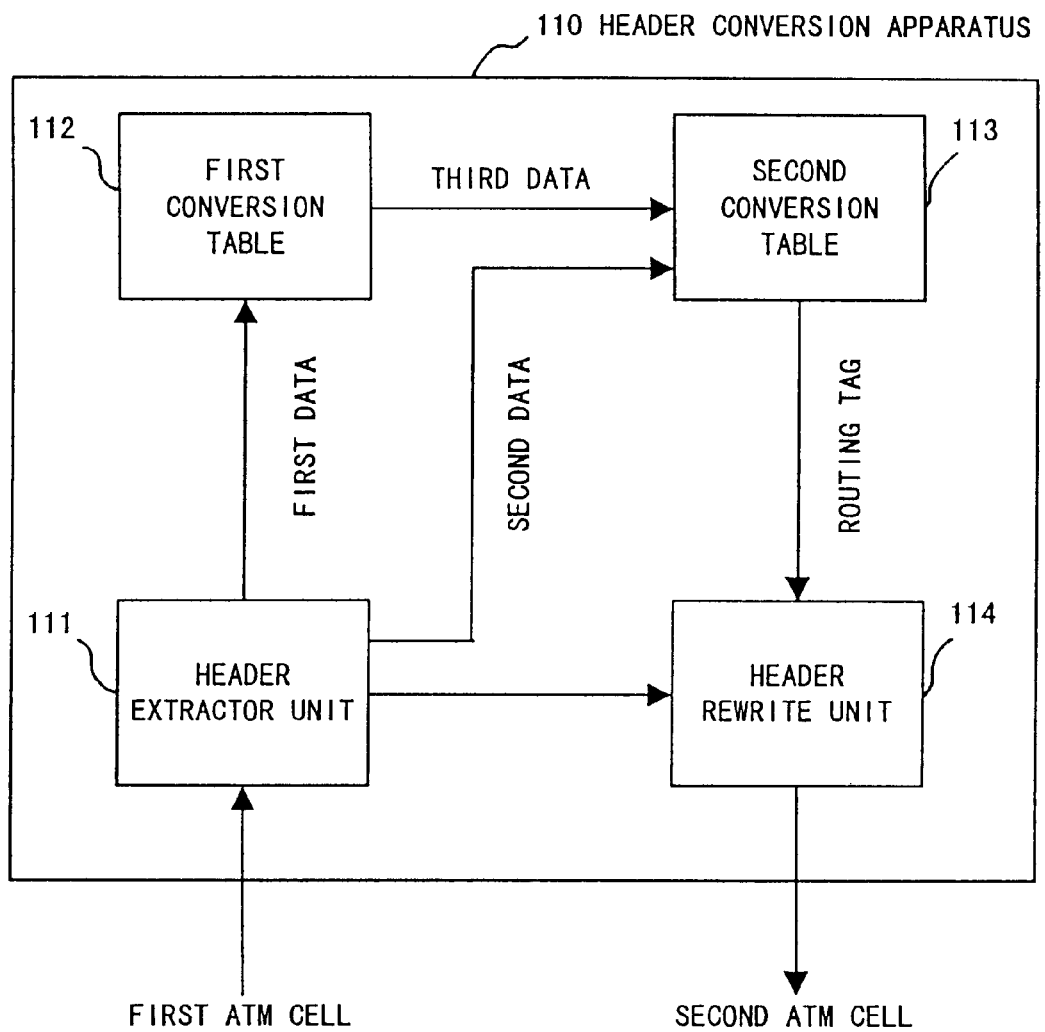
F I G. 6

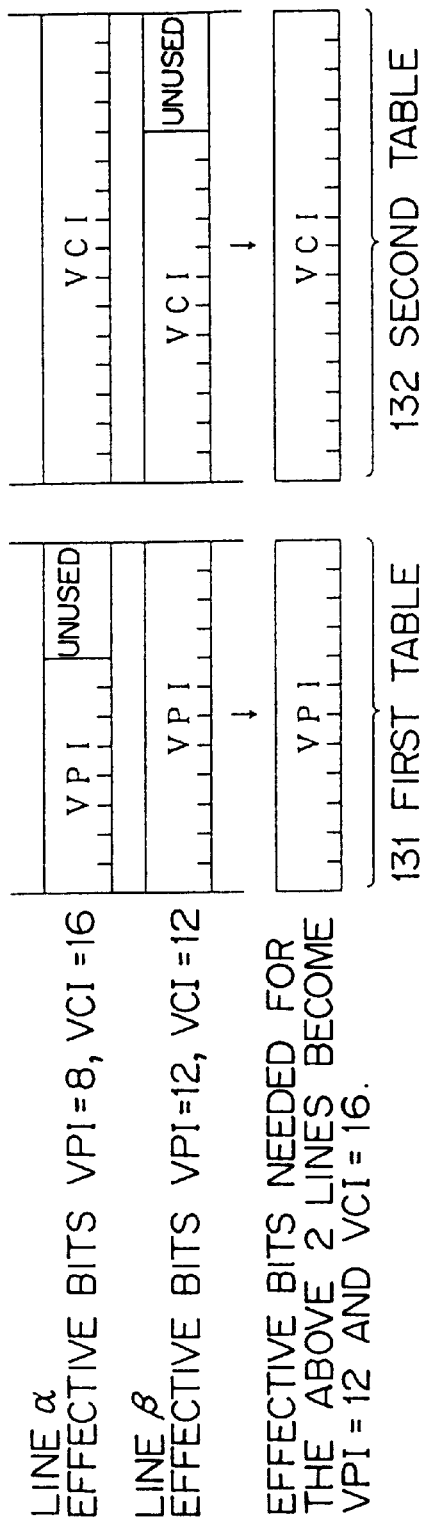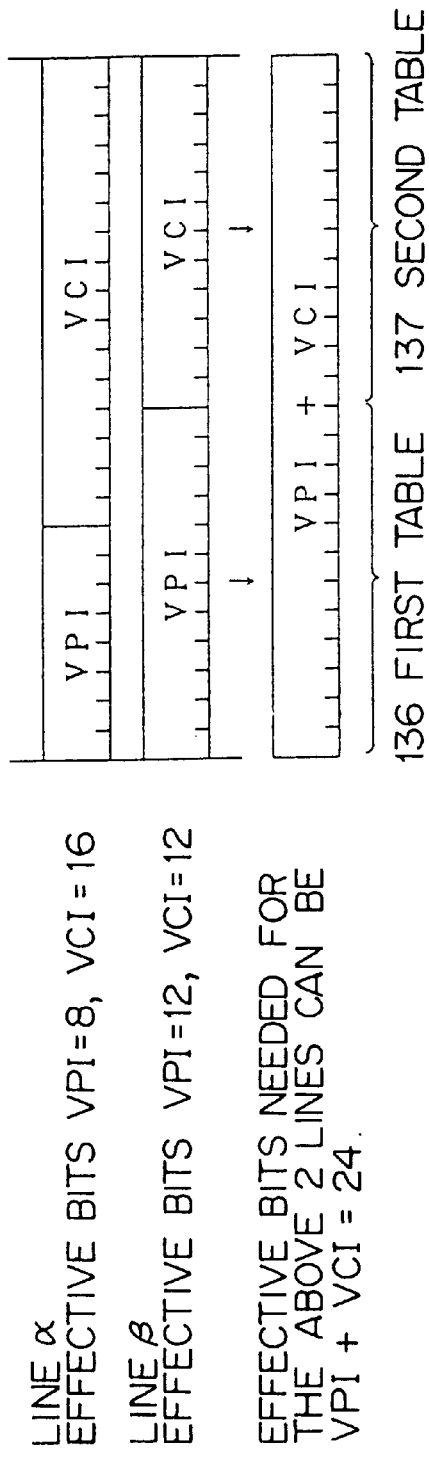
FIG. 8(A)
FIG. 8(B)

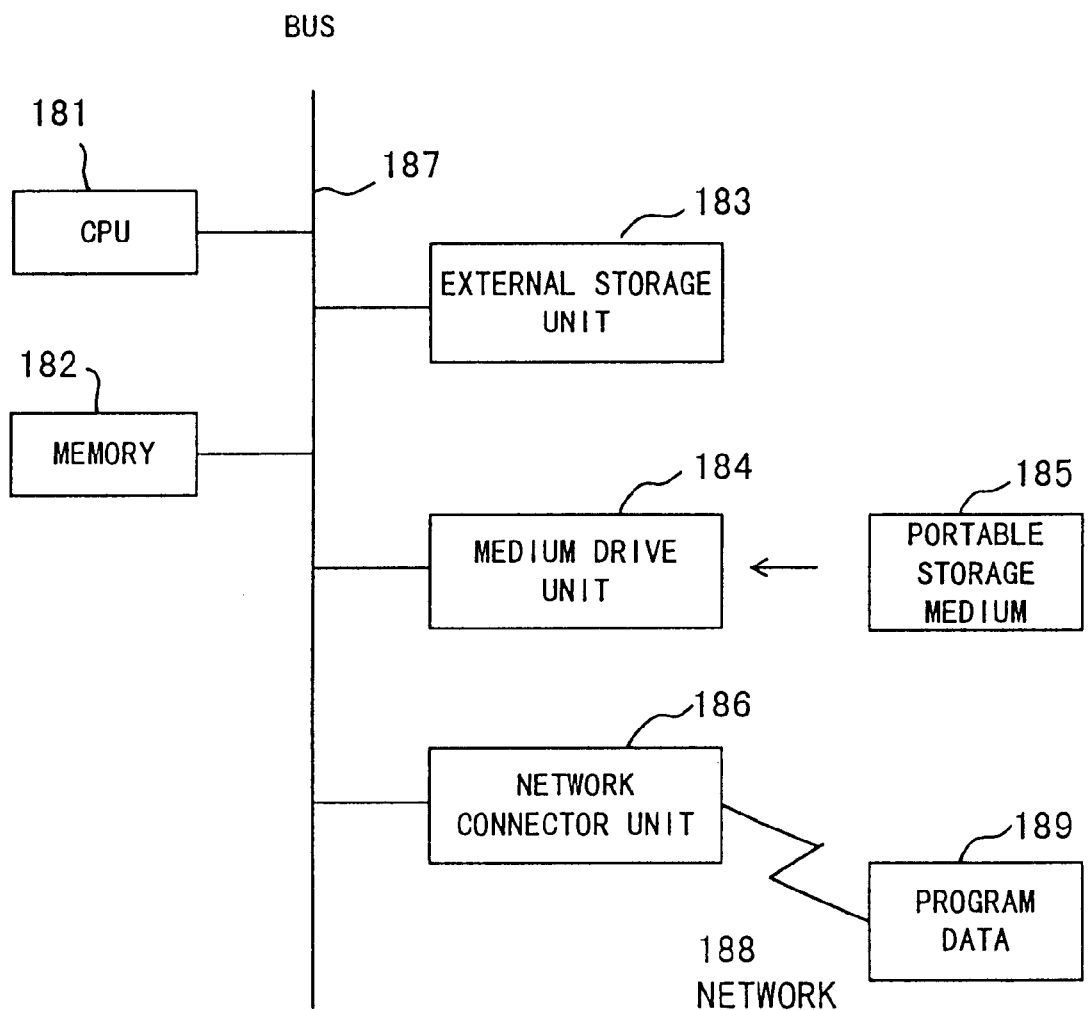
F I G. 15

MULTILINE-CORRESPONDENT CELL HEADER CONVERSION APPARATUS AND METHOD

BACKGROUND OF THE INVENTION

1. Field of the Invention

The present invention relates to a cell header conversion apparatus and the method of handling a plurality of communication lines (hereinafter called a "multiline") for converting route information set in the header of a packet such as a cell, etc., and a computer-readable storage medium storing a program which enables a computer to perform processing to implement the method.

2. Description of the Related Art

In an ATM (Asynchronous Transfer Mode) network, information is transmitted in units of cells with a fixed length of 53 bytes in total (a kind of length-fixed packet) from a transmitting terminal to a receiving terminal, by being split into 48 bytes and being provided with a header of 5 bytes as address label information. A cell transmitted to an ATM network is switched at a high speed at each node by way of hardware according to a VPI (Virtual Path Identifier) and a VCI (Virtual Channel Identifier) in the header. For a form of switch unit provided in each of the nodes a self-routing switch is widely known, in which the cell selects its own communication route according to the header, in the switch unit using a routing tag attached to the cell. When the cell is received by a target receiving terminal, the header of the cell is verified at the receiving terminal, and the cell is restored to the original information. Here, a VPI is an identifier which is used to identify a VP (Virtual Path) being a plurality of virtual communication paths established between each node in a network, and a VCI is an identifier used to identify a VC (Virtual Channel) being a virtual communication channel in the VP.

Since when an ATM connection is established, peculiar VPI and VCI are assigned to each link between nodes, the values of the VPI and VCI are converted every time the cell passes through each node. This conversion is performed by a header rewrite unit in the node rewriting the VPI and VCI in the cell. For this header conversion process method a conversion method using a simple table or a conversion method by a matching process using a CAM (Contents Association Memory) is generally adopted.

Recently the need for a multiline has increased due to improvements in the integration of LSIs. The multiline has a merit of being capable of reducing costs per subscriber by replacing one subscriber interface/1PWCB (Printed Wiring Circuit Board) with a plurality of subscriber interfaces/1PWCB. In order to implement a multiline,for example, it is necessary to attach to the header of a cell a line identifier (hereinafter called "TAGD")for newly indicating the line order of the multiline in the network node of an ATM switching equipment,etc.

Namely, in order to increase the number of network interfaces of a node, it is necessary to attach appropriate VPI, VCI and TAGD to the cell transferred within the network according to the VP, VC and line in a target route at each node, and thereby the cell is transferred to its final destination.

FIG. 1 explains a TAGD-attached cell header conversion method using a simple table as a first prior art, and shows a configuration in the case where the VPI, VCI and TAGD of an input cell 11 are converted into the VPI, VCI and TAGD of an output cell 12. FIG. 2 explains the boundary control process in the boundary control unit 13 shown in FIG. 1. FIG. 3 shows data stored in the conversion table 14 shown in FIG. 1 as entries.

As shown in FIG. 1, in the case of an NNI (Network Node Interface), the VPI, VCI and TAGD in the header of the input cell 11 are 12 bits (8 bits in the case of a UNI (User Network Interface), for the case of an NNI and UNI, described later), 16 bits and 9 bits, respectively, and the input cell 11 is inputted to the boundary control unit 13. In the boundary control unit 13 a predetermined number of bits on the LSB (Least Significant Bit) side of VPI, VCI and TAGD are extracted from the total of 37 bits (33 bits in the case of UNI) consisting of VPI, VCI and TAGD as actually used effective bits, and the entry address of the conversion table 14 is generated by combining these effective bits. In the example shown in FIG. 2, the boundary control unit 13 extracts a bits of VPI 16a, b bits of VCI 16b and c bits of TAGD 16c from the header of the input cell 11, generates (a+b+c) bits of an address 17 by combining them, and performs a boundary control process for outputting this address 17 as the entry address of the conversion table 14. 37 bits in total of data 18 consisting of the post-conversion VPI (12 bits), post-conversion VCI (16 bits) and post-conversion TAGD (9 bits) in the conversion table 14 shown in FIG. 3 which are stored in the address outputted from the boundary control unit 13 are outputted to a header rewrite unit 15. The header rewrite unit 15 rewrites the VPI (12 bits), VCI (16 bits) and TAGD (9 bits) of the header of the input cell 11 to the post-conversion VPI (12 bits), post-conversion VCI (16 bits) and post-conversion TAGD (9 bits) inputted from the conversion table 14, and outputs the cell with the rewritten header as an output cell 12.

FIG. 4 shows a matching process using a CAM as a second prior art, explains a TAGD-attached cell header conversion method, and shows a configuration in the case where the VPI, VCI and TAGD of the input cell 21 are converted to the VPI, VCI and TAGD of the output cell 22. FIG. 5 shows data stored in the entry of a matching table 25.

As shown in FIG. 4, a matching detector unit 24 controls an address counter 26, compares the total of 37 bits of data consisting of the VPI, VCI and TAGD of the input cell 21 with the total of 37 bits of data 27a consisting of pre-conversion VPI, pre-conversion VCI and pre-conversion TAGD being a part of data 27 stored in each entry of the matching table 25 shown in FIG. 5, and reads the total of 37 bits of data 27b consisting of the post-conversion VPI, post-conversion VCI and post-conversion TAGD shown in FIG. 5 of the entry in which the pre-conversion VPI, pre-conversion VCI and pre-conversion TAGD matching with the VPI, VCI and TAGD of the input cell 11 are stored, from the matching table 25 as the VPI, VCI and TAGD of the output cell 22. Then, the matching detector unit 24 outputs the total of 37 bits of the data 27a consisting of the VPI, VCI and TAGD of the output cell 22 to a header rewrite unit 23. The header rewrite unit 23 rewrites the total of 37 bits consisting of VPI, VCI and TAGD set in the header of the input cell 21 to the total of 37 bits consisting of VPI, VCI and TAGD (the data 27b) inputted from the matching detector unit 24 to generate an output cell 22.

A UNI is an interface between a user's terminal and a network, and an NNI is an interface between two network nodes (for example, two items of ATM switching equipment).

The header conversion method using a simple table as the first prior art has a drawback in that as the total effective bit length of the VPI, VCI and TAGD becomes large, the memory capacity of the conversion table 14 also becomes large. For example, when the total bit length of the VPI, VCI and TAGD of the header of the input cell 11 is 37 bits, if the effective bit length of a VPI a for performing a boundary control using the boundary control unit 13, the effective bit length of a VCI b, and the effective bit length of a TAGD c, are assumed to be 6 bits, 10 bits and 2 bits, respectively, the number of addresses (number of entries) of the conversion table 14 is at the most $2^{18}$ bits, and the capacity of a RAM needed when the conversion table 14 is composed of a RAM is approximately $2^{18} \times 37 = 9.7$ Mbits. However, the RAM capacity needed when a=12, b=16 and c=5 becomes $2^{33} \times 37 = 317.82$ Gbits. In an actual operation the processing of the number of bits nearly equal to the latter is required. Accordingly, when the total effective bit length of the VPI, VCI and TAGD is large, this method requires a memory with a large capacity, and thereby becomes expensive and economically inferior.

In the header conversion method using a matching process as the second prior art it is necessary to substantially match the pre-conversion VPI, pre-conversion VCI and pre-conversion TAGD being a part of the data 27 stored in all the entries of the matching table 25, with the VPI, VCI and TAGD set in the header of the input cell 21, while the cell passes through the matching detector unit 24. The time for one cell to pass through is approximately 2.7 microseconds at a line speed of 155.52 Mbps, and is only 0.7 micro-seconds at a line speed of 622.08 Mbps. The frequency of reference to the entries of the matching table 25 for a matching process is restricted. Although it depends on the address number to be referred to, a matching with data 27 of over 4,096 pieces is usually required. It is actually impossible to perform this process within the one cell pass time, and in fact, by multiplexing a plurality of cells, the system is only configured so that the apparent matching process speed can become less than the one cell pass time. For this reason, the circuitry becomes complicated and large-scaled. Furthermore, since a high-speed and expensive LSI built-in memory and a single chip memory are needed to increase an access speed to the matching table 25, this method becomes expensive and uneconomical.

In the case of one subscriber interface/1PWCB, that is, when one subscriber line is handled by one PWCB, the effective bit lengths of VPI and VCI per subscriber line have no connection with other subscriber lines in the same PWCB, even if the lengths are made variable within the range of certain bit lengths. Therefore, the effective bit lengths of VPI and VCI can be determined within the bit range of the ATM standards only for one corresponding subscriber line. However, in the case of a plurality of subscriber interfaces/1PWCB, that is, when a plurality of subscriber lines are handled by one PWCB, the number of bits of the TAGD is added, each effective number of bits of the VPI and VCI increases, and the necessary bit lengths of the VPI, VCI and TAGD differ between the subscriber lines. Therefore, after each of the effective bit lengths of the VPI, VCI and TAGD are set to the largest bit length each out of the effective bit lengths of the VPI, VCI and TAGD of all the subscriber lines, the header conversion process has to be performed. For example, if in the case of one subscriber interface/IPWCB, VPI=8 bits and VCI=12 bits, the conversion table 14 is mounted on a PWCB using a memory with the memory capacity corresponding to an address space with an address width of 20 bits (=$2^{20}$ bits). However, if in the case of a plurality of subscriber interfaces/1PWCB, for example, two subscriber interfaces/1PWCB, VPI=8 bits and VCI=12 bits in a subscriber line α, and VPI=6 bits and VCI=16 bits in a subscriber line β; the necessary number of bits (effective bit lengths) of VPI and VCI have to be set to VPI=8 bits (subscriber line α) and VCI=16 bits (subscriber line β), respectively, both of which are the larger number of bits of the VPI and VCI of the subscriber lines α and β. For this reason, the conversion table 14 has to be mounted on a PWCB using a memory with a memory capacity corresponding to an address space with an address width of 24 (=8+16) bits (=$2^{24}$ bits). In this way, since the more a corresponding number of subscriber lines increases, the larger the number of bits of an address for accessing the entry of the conversion table 14 becomes, the more a corresponding number of subscriber lines increases, the larger the memory capacity of a memory for configuring the conversion table 14 becomes, and the higher the memory cost of the PWCB becomes, which are problems.

SUMMARY OF THE INVENTION

The present invention is made in order to solve these problems and it is an object of the present invention to improve the header conversion method which needs complicated circuitry and expensive memory which are drawbacks of the prior arts, and to provide a multiline-correspondent cell header conversion apparatus and the method for performing a header conversion at a high speed with a small memory capacity.

The present invention is theoretically and basically a table-reference method, and by providing a plurality of tables and restricting the total number of route information patterns composed of the combinations of a VPI, VCI, TAGD and so forth which are set in the header of a multiline-correspondent cell and which need to be converted, the total capacity of memories needed to configure the plurality of tables is reduced, inexpensive memories can be adopted, and simultaneously the circuit configuration is simplified. Thus, an inexpensive multiline-correspondent cell header conversion method becomes available.

For this reason, the multiline-correspondent cell header conversion apparatus of the present invention is a multiline-correspondent cell header conversion apparatus for converting cell header information in which a plurality of subscriber lines are multiplexed. The multiline-correspondent cell header conversion apparatus comprises a first table for matching the first data on first route information set in the cell pre-conversion header with specific corresponding data out of a plurality of corresponding data, a second table for matching third data obtained from both the second data on the first route information and the specific corresponding data with second route information set in the cell post-conversion header, a header converter unit for converting the route information set in the cell header from the first route information to the second route information by referring to the first and second tables, and a control unit for dynamically setting and cancelling the correspondence between the first data on the first route information set in the cell pre-conversion header and the specific corresponding data and go dynamically setting and cancelling the correspondence between the third data in the second table and the second route information in the post-conversion header of the cell.

In this configuration, according to the multiline-correspondent cell header conversion apparatus of the present invention, since the first route information set in a cell header is converted using the first and second tables, a table with a larger address space (enabling many entries) than the single table of the prior arts described earlier can be configured using a memory with the same capacity and utilizing the first and second tables. As a result, the multi-bit first route information can be converted to the second route information set in the post-conversion header of the cell at a high speed using a memory with a small capacity.

In the multiline-correspondent cell header conversion apparatus of the present invention the header converter unit can also comprise, for example, a header extractor unit for extracting the first route information from the cell pre-conversion header, outputting the first data on the first route information as the first entry address of the first table and outputting the second data on the first route information as a first bit string composing the second entry address of the second table, and a header rewrite unit for accessing the first table using the first entry address of the first table and reading the specific corresponding data from the first table, accessing the second table by outputting the read data as a second bit string composing the second entry address of the second table, reading the second route information, and rewriting the first route information set in the header of the cell to the second route information.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 1 explains a header conversion method using a certain simple table being a first prior art.

FIG. 6 explains the operational principle of an embodiment of the header conversion apparatus of the present invention.

FIG. 7A shows the conversion of the VPI, VCI and TAGD in the header of an input cell of which the effective bits are a bits, b bits and c bits, respectively, to a routing tag of d bits. FIG. 7B shows the two-dimensional expression of a conversion table for the header of the input cell shown in FIG. 7A as a table consisting of $2^x=I$ rows and $2^{(a+b+c-x)}=J$ columns. FIG. 7C shows the configuring of first and second tables in a memory with X-bits width×$2^Y$ words depth.

FIGS. 8A and 8B compare the embodiment of the present invention and the conventional header conversion method when the number of lines is two in a multilines system. FIG. 8A shows the conventional header conversion method, and FIG. 8B shows the header conversion method of the embodiment of the present invention.

FIG. 15 shows a configuration of a computer for implementing the cell header conversion method of the embodiment of the present invention.

DESCRIPTION OF THE PREFERRED EMBODIMENTS

The embodiments of the present invention are described in detail below with reference to the drawings.

FIG. 6 explains the operational principle of an embodiment of a header conversion apparatus 110 of the present invention.

A header extractor unit 111 extracts the effective bits of input route information set in the header from the first ATM cell inputted through each line of a multiline system. Then, by dividing the data comprising a bit string with a predetermined bit length consisting of the effective bits into two at a predetermined bit position, the header extractor unit 111 generates first data and second data, outputs the first data to a first conversion table 112 as the address signal of the entry, and outputs the second data to a second conversion table 113 as a lower-order address signal. The first conversion table 112 receives the first data inputted from the header extractor unit 111 as the address signal of an entry, and outputs third data whose number of bits is less than the number of bits of the first data stored in the entry to the second conversion table 113 as a higher-order address signal. The second conversion table 113 receives the third data inputted from the first conversion table 112 as a higher-order address signal, receives the second data inputted from the header extractor unit 111 as a lower-order address signal, and outputs the data stored in the entry of an address consisting of the two address signals to a header rewrite unit 114 as a routing tag. The header rewrite unit 114 rewrites the input route information of the header of the first ATM cell received from the header extractor unit 111 to the routing tag inputted from the second conversion table 113, and outputs the second ATM cell with the rewritten header information to an ATM switch, not shown in FIG. 6.

Figure 2:
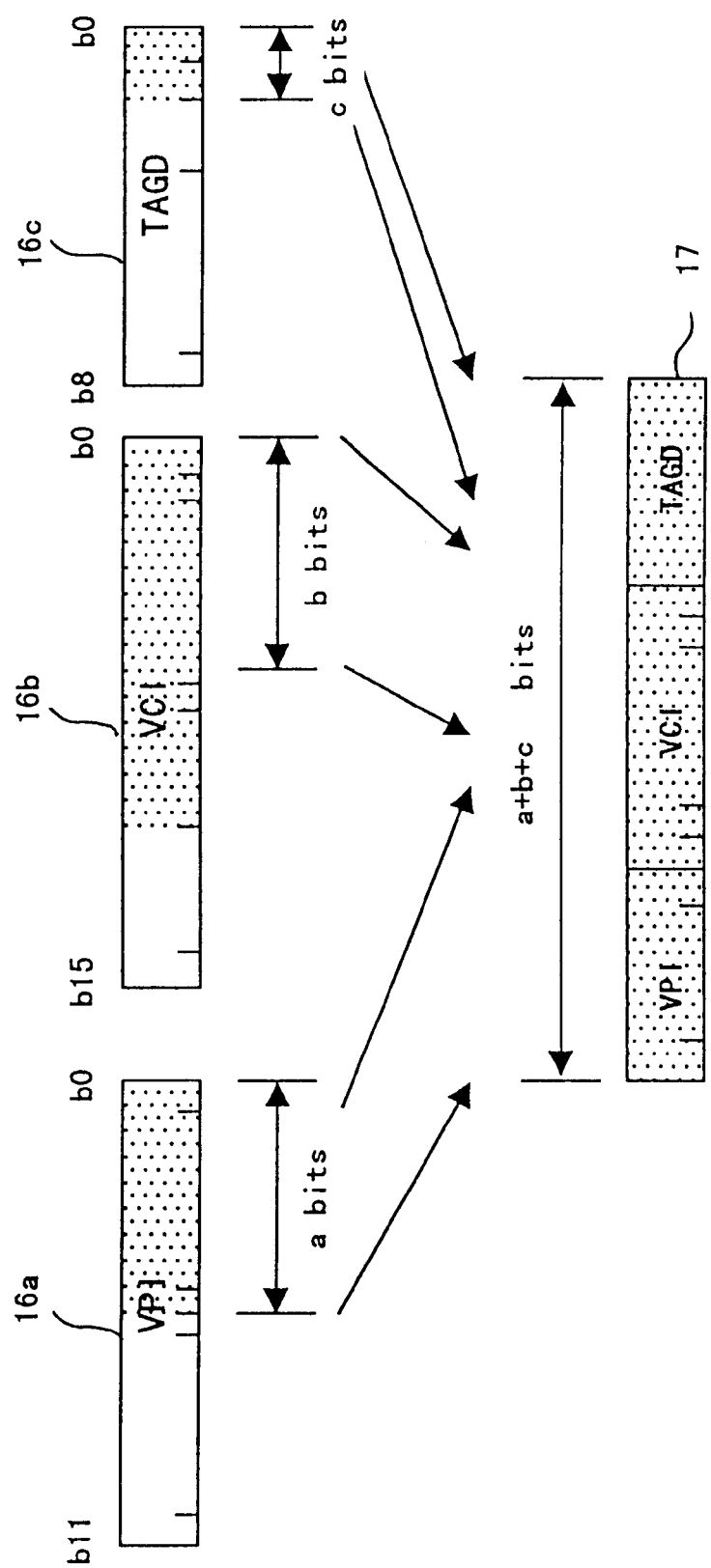
FIG. 2 explains a boundary control process in the boundary control unit shown in FIG. 1.
Figure 3:
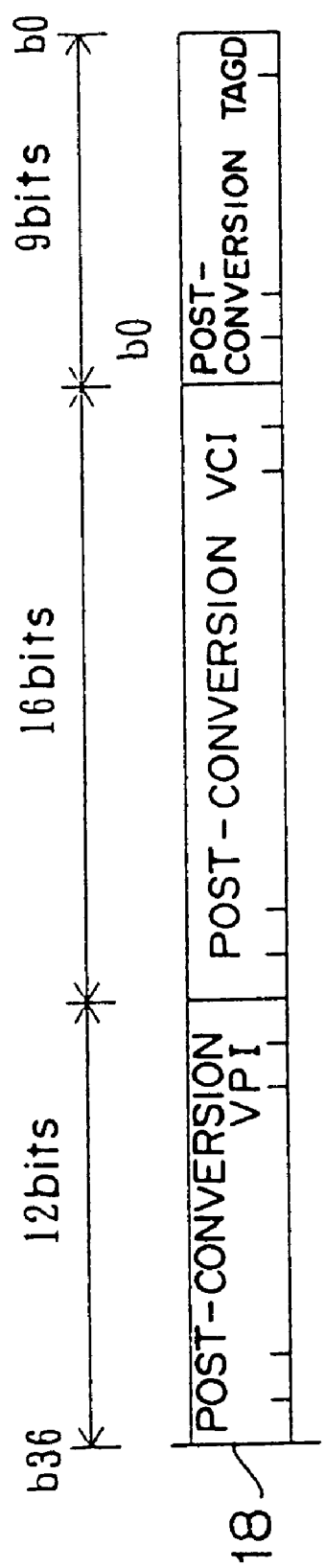
FIG. 3 shows data stored in an entry of the conversion table shown in FIG. 1.
Figure 4:
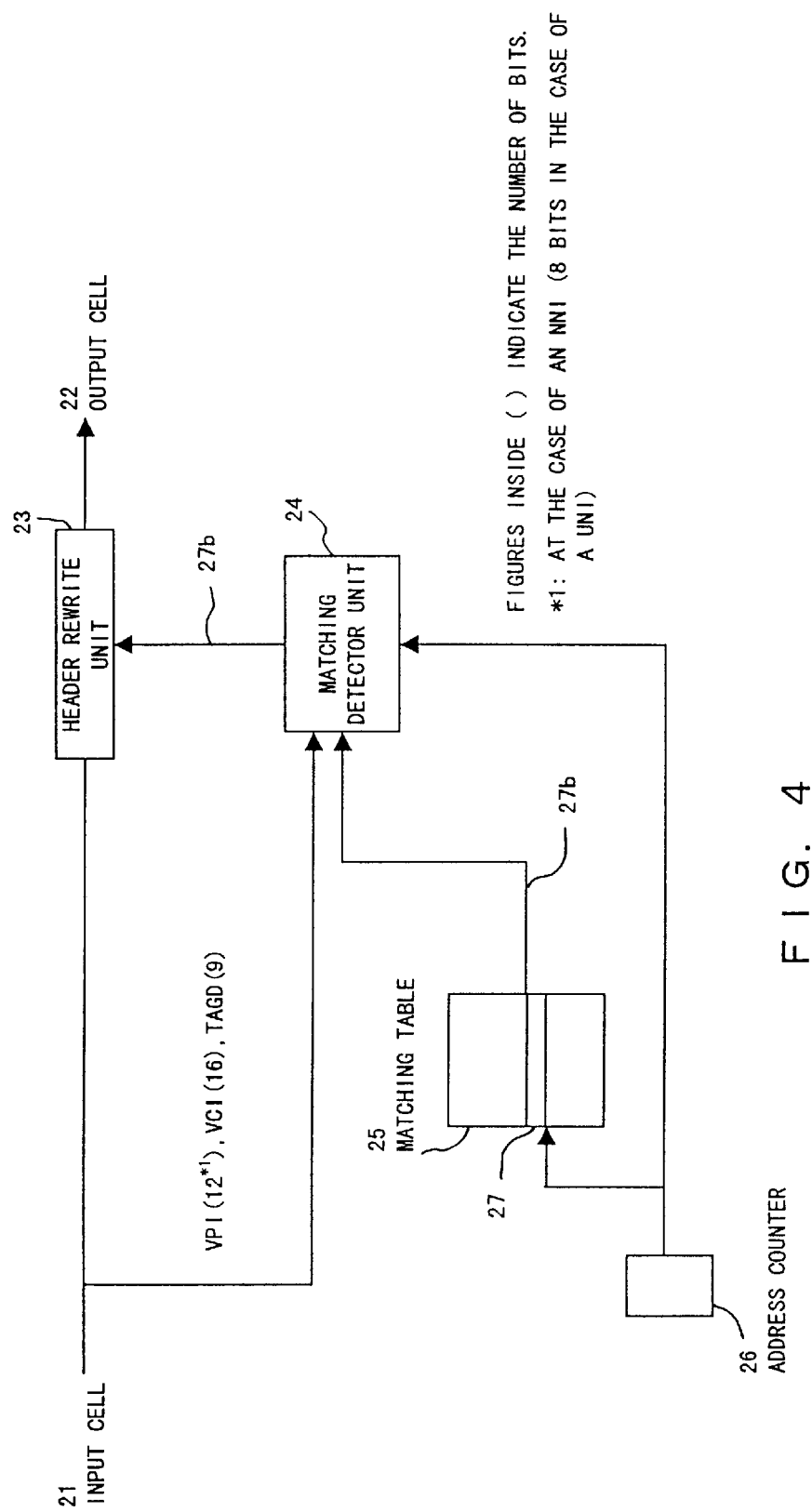
FIG. 4 explains a header conversion method using the matching process by CAM being a second prior art.
Figure 5:
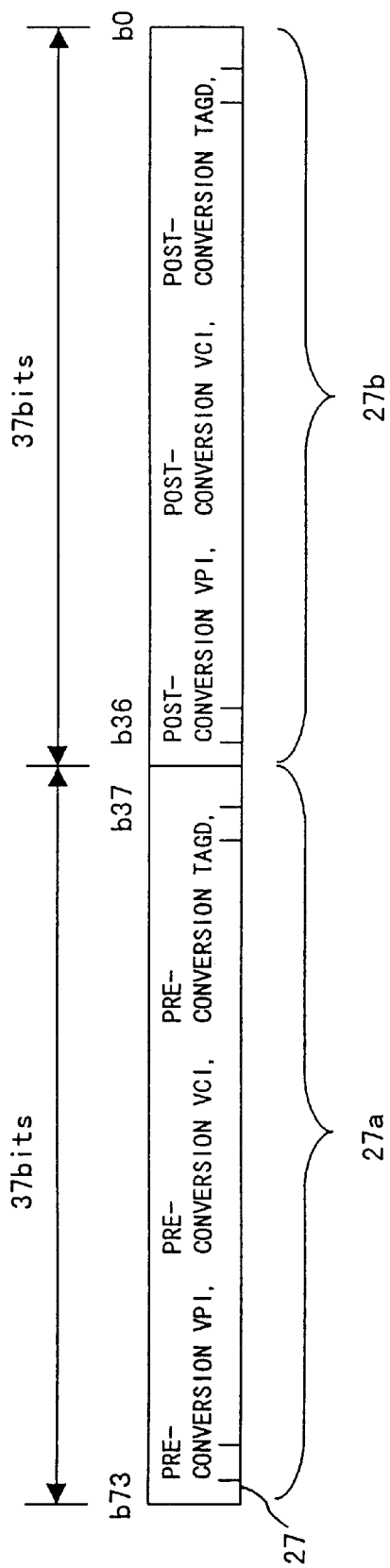
FIG. 5 shows data stored in an entry of the matching table shown in FIG. 1.
Figure 7:
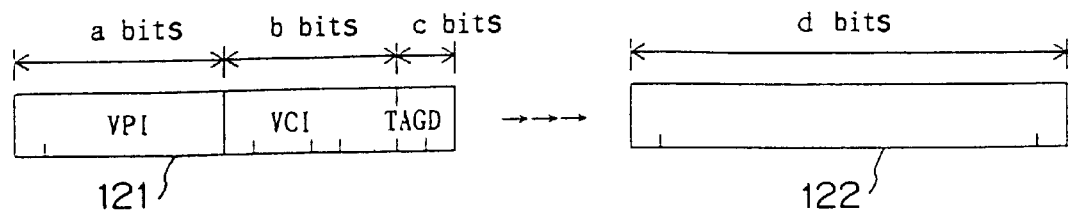
FIGS. 7A, 7B and 7C explain the theoretical header rewrite process of an ATM cell in the header conversion apparatus shown in FIG. 6.
Figure 7:
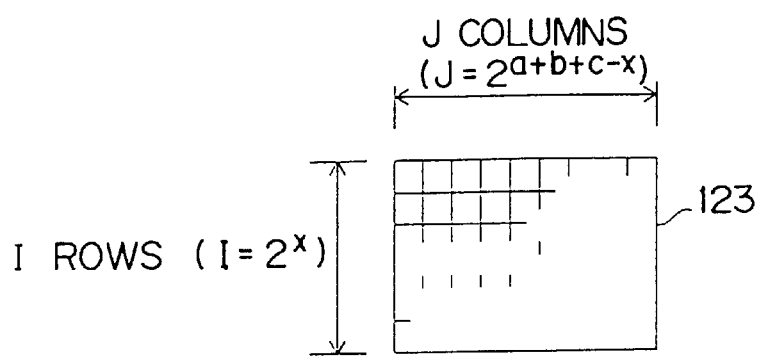
Figure 7:
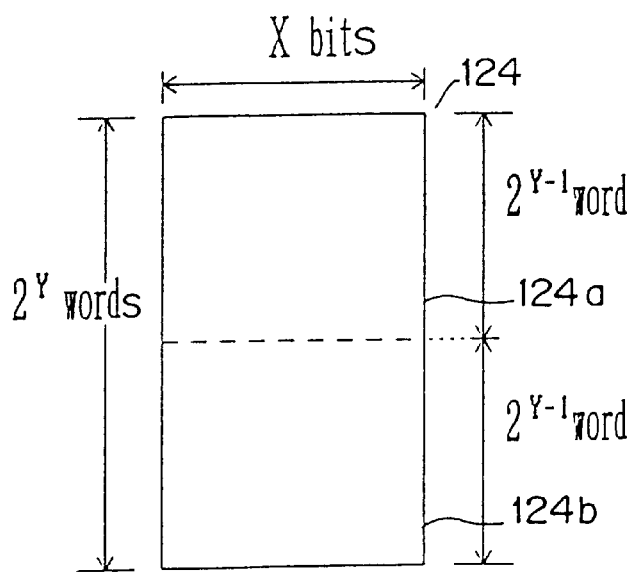

FIGS. 7A, 7B and 7C explain the theoretical header rewrite process of an ATM cell (the first ATM cell shown in FIG. 6) in the header conversion apparatus 110.

FIGS. 7A, 7B and 7C explain a method for converting VPI, VCI and TAGD in the header of an input cell of which the effective bits are a, b and c, respectively, to a routing tag. 122 of d bits, as shown in FIG. 7A.

In the conventional table-reference method shown in FIG. 1, when the effective bit of the VPI, VCI and TAGD of the header of (a+b+c) bits of an input cell is converted to a corresponding routing tag of d bits, the routing tag is obtained by accessing the conversion table 14 shown in FIG. 1 with (a+b+c) bits of data 121 which are obtained by combining the effective bits of the VPI, VCI and TAGD of the input cell, as the address of an entry. In this case, the conversion table 14 has to store d bits of the routing tag 122 with a value corresponding to the value of the data 121 as entries to which all possible values (a+b+c) bits of the data obtained by combining the effective bits of the VPI, VCI and TAGD are input as an address. This conversion table 14, for example, can be expressed two-dimensionally as a table 123 consisting of $2^x=I$ rows and $2^{(a+b+c-x)}=J$ columns, as shown in FIG. 7B. At each intersection (i, j) of this table 123, d bits of the routing tag 122 is stored. In this case, i=0 to $2^x-1$, and j=0 to $2^{(a+b+c-x)}-1$. I is the value "$2^x$" of the x lower-order bits of the data 121, and J is the value "$2^{(a+b+c-x)}$" of (a+b+c) higher-order bits of the data 121. The memory capacity of the table 123 is (d bits of routing tag 122)$\times 2^x \times 2^{(a+b+c-x)} \times 2^{(a+b+c+x)}$ bits. I and J are natural numbers meeting the condition of I$\times$J=$2^{(2+b+c)}$, and x can take any value from "0" to "a+b+c".

Therefore, the capacity of the table 123 increases rapidly (increases proportional to $2^{(a+b+c)}$) as the number of bits of (a+b+c) bits being the total bit length of each of the effective bits of the VPI, VCI and TAGD of an input cell. However, in an actual ATM network, since a probability that all the VCs of all VPs are simultaneously used is very low, the total number of the combinations among effective VPI, VCI and TAGD of which the conversion is actually needed is restricted to below a certain number which is far less than the total number "$2^{(a+b+c)}$" of all the combinations among all the possible values of each of VPI VCI and TAGD.

For this reason, assuming that the number of the combinations of all the simultaneously possible values of the effective bits of each of VPI, VCI and TAGD is less than the number of the combinations of all the possible values of each of the effective bits of the VPI, VCI and TAGD, the table 123 is split into a plurality of tables for each row. Then, tables needed to convert route information consisting of each effective bit of the VPI, VCI and TAGD to a corresponding routing tag are dynamically generated and deleted in a memory, out of the plurality of tables which are obtained by splitting the table 123 for each row according to the value of each of the effective bits of the VPI, VCI and TAGD for which the conversion is needed, that is, the value "$2^{(a+b+c)}$" of (a+b+c) bits of the data 121. In this way, the size of a necessary table, that is, the capacity of a memory for configuring the table, can be reduced. For example, as shown in FIG. 7A, when the total number of the combinations of each of the effective bits of the VPI, VCI and TAGD needing an actual conversion is "$2^d$", assuming that the number of bits of a target routing tag 122 is d, the maximum number of the tables split for each row of the table 123 needed to correctly convert the data 121 of the (a+b+c) bits to d bits of the routing tag is "$2^d$", and never exceeds "$2^d$".

Next, the summary of a multiline-correspondent cell header conversion performed based on the principle of this embodiment is briefly described below, of which the details are described later. (a+b+c) bits of the data 121 (a first data) shown in FIG. 7A consisting of the effective bits of the VPI, VCI and TAGD of the header of an input cell, are divided into (a+b+c−x) higher-order bits of a second data and x lower-order bits of a third data, and Z bits of a fourth data stored in the entry of a first table are extracted as the entry address of the first table of the second data. Then, d bits of the routing tag 122 shown in FIG. 7A stored in the entry of a second table are extracted with (x+Z) bits of a fifth data having the fourth data extracted from the first table and the third data being the x lower-order bits of the data 121 as higher-order bits and lower-order bits, respectively, as the entry address of the second table. Then, the VPI, VCI and TAGD of the input cell header are replaced with d bits of the extracted routing tag 122.

In the configuration, (a+b+c−x) bits of the second data select a specific column j needed for a header conversion out of J columns of the table 123 shown in FIG. 7B. Then, (x+Z) bits of the fifth data selects row i storing the routing tag 122 out of I rows belonging to the specific j column.

Next, the relationship between the effective number of bits of the VPI, VCI and TAGD of an input cell and the number of bits of the fourth data stored in the first table (the number of bits of a base address described later) is described below.

First, the first and second tables are configured in a memory 124 with X-bits width$\times 2^Y$ words depth. If the memory 124 is split into two halves, two memories with X-bits width$\times 2^{Y-1}$ words depth can be obtained. If the two memories 124a and 124b are assumed to be configured as the first and second tables, respectively, both of the first and second tables can store $2^{Y-1}$ words each of X bits of data. That is, (Y−1) bits of addresses are needed to access all the entries of each of the first and second tables. Since d bits of a routing tag have to be stored in the entry of the second table, X has to be d or more.

Next, the number of the effective bits (a+b+c) of the VPI, VCI and TAGD of an input cell is determined so as to make the number of compressed (converted) bits a minimum. As described above, the maximum values of the address spaces of the first and second tables are both $2^{Y-1}$ bits, and the following equation is established.

(Number of the effective bits (a+b+c) of VPI, VCI and TAGD of the input cell when the number of compressed bits becomes a minimum)=(Y−1)+{(Y−1)−Z}=2(Y−1)−Z where the (Y−1) of the first term of the equation is the number of bits used as the entry address of the first table out of the effective bits of (a+b+c) bits, and the {(Y−1)−Z} of the second term of the equation is the remaining number of bits of the effective bits of (a+b+c) bits to complement the entry address of the second table when it is presumed that the Z-bits output of the first table becomes the higher-order bit of the entry address of the second table and an inequality of (Y−1)>X$\geq$Z is established. Accordingly, the number of the effective bits (a+b+c) of the VPI, VCI and TAGD of an input cell when the number of compressed bits becomes a minimum can be calculated from 2Y−Z−2.

The third term can be interpreted as follows. If the first and second tables are logically taken as one table, this table has $2^{2(Y-1)}$ bits of address space. Therefore, 2(Y−1) bits of an address are needed to access all the entries of this table. Since out of this 2(Y−1) bits Z bits are obtained as the output of the first table, the {2(Y−1)−Z} bit becomes the number of effective bits (a+b+c) of the VPI, VCI and TAGD of an input cell when the number of compressed bits becomes a minimum. In this case, too, it is presumed that the inequality of (Y−1)>X$\geq$Z is established.

In this way, by configuring the first and second tables in an one-chip memory of X-bits width$\times 2^Y$ words depth, each of the effective bits of the VPI, VCI and TACD of (a+b+c) bits of an input cell can be converted into d bits of a routing tag 122. Provided, however, that X$\geq$Z, X$\geq$d, and a+b+c= 2Y−Z−2.

In the header conversion process of this embodiment, since even in the case of a multiline system, the number of effective bits a and b of VPI and VCI, respectively, can be properly and flexibly assigned to each subscriber line, only if the total number of the effective bits of the VPI and VCI, that is, the maximum number of (a+b+c) bits is determined (in the case of a multiline system it is desirable that the number of effective bits of TAGD is fixed, and the number of effective bits of TAGD is the higher-order bit of an address inputted to the first table), the capacity of the memory 124 for mounting the first and second tables can be reduced. Taking into consideration the number of the line of a multiline of each PWCB subscriber interface in addition to the maximum number of bits of the (a+b) bits, a header conversion can also be performed by setting the number of bits of a (a+b+c) bits to an optimum value for each PWCB.

FIGS. 8A and 8B compare the embodiment of the present invention with the conventional header conversion method, in the case of two lines of multilines (for example, Laid-open Patent Publication No. 5-268241 as publicized by the Japanese Patent Office).

When in a subscriber line a the number of effective bits of VPI=8 and the number of effective bits of VCI=16, and in a subscriber line β the number of effective bits of VPI=12 and the number of effective bits of VCI=12, it is necessary to adjust the numbers of bits of VPI and VCI to the larger numbers of effective bits of VPI and VCI, respectively, of the subscriber lines α and β, since in the conventional header conversion method shown in FIG. 8A the VPI and VCI values are used for the entry addresses for the first table 131 and second table 132, respectively. That is, 12 bits (subscriber line α) and 16 bits (subscriber line β) have to be assigned for the numbers of effective bits of VPI and VCI, respectively. For this reason, the total number of effective bits of VPI used as the entry address of the first table 131 and the effective bits of VCI used as the entry address of the second table becomes 28 (=12+16). In this embodiment, as shown in FIG. 8B, the total number of effective bits of VPI and VCI used as the entry addresses of the first table 136 and second table 137 is 24. Accordingly, the number of bits of the (a+b+c) of this embodiment can be made 4 bits less than that of the conventional method. As a result, the memory capacity for configuring the first table 136 and second table 137 of this embodiment can be made smaller than that for configuring a conventional first table 131 and second table 132.

Figure 9:
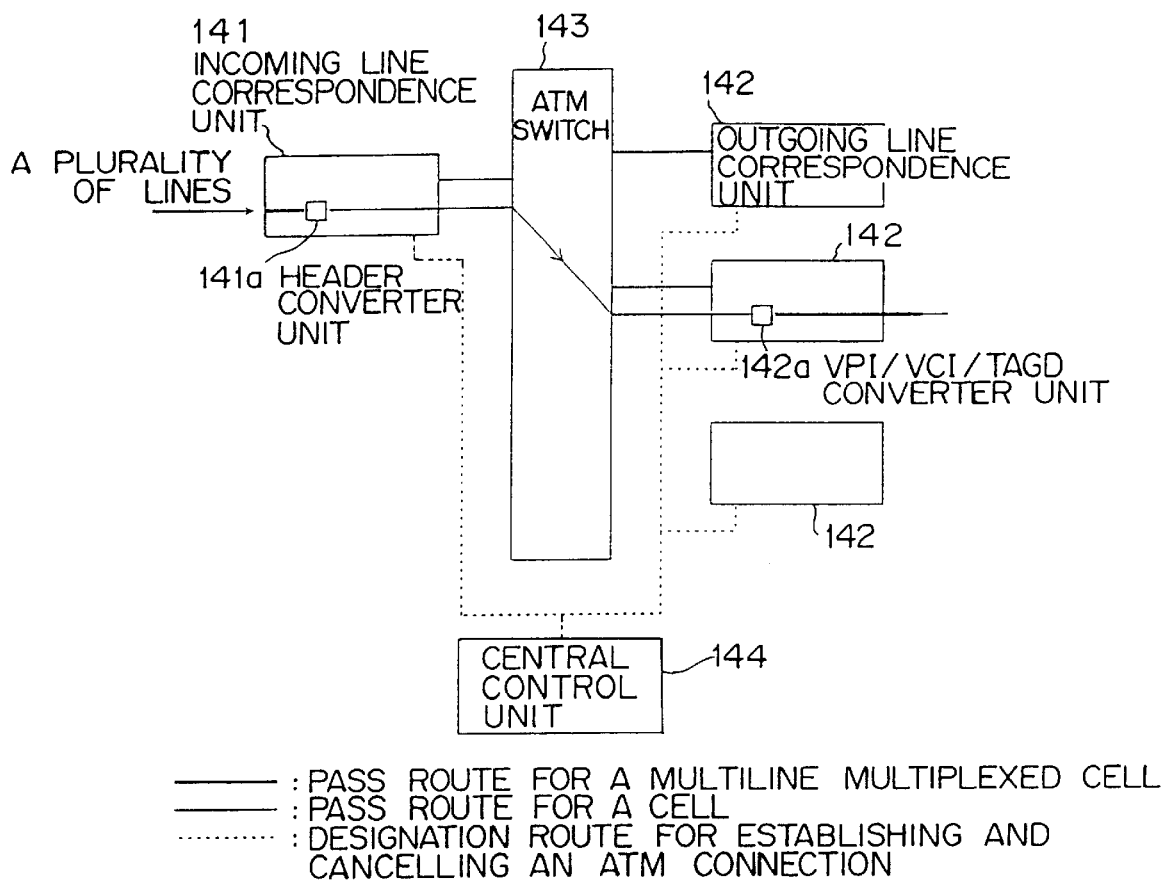
FIG. 9 shows a system configuration of an embodiment of the present invention.

FIG. 9 shows a system configuration of the embodiment of the present invention.

An incoming line correspondence unit 141 comprises a header conversion function for terminating each physical layer of a multiline, receiving a multiplexed input cell, demultiplexing the multiplexed input cell to individual input cells, extracting input route information (VPI, VCI and TAGD) from the individual input cells using a header converter unit 141a, converting the extracted input route information to a routing tag (final target value) needed to route the cell with the header to the final destination in an ATM switch 143 and rewriting the header of the input cell to the routing tag according to the input route information. The header converter unit 141a generates routing tags by the header conversion method. TAGD, for example, is attached to the header of an input cell of 53 bytes by an interface circuit, not shown in the diagram, provided before the header converter unit 141a in the incoming line correspondence unit 141.

An outgoing line correspondence unit 142 comprises a VPI/VCI/TAGD converter unit 142a for converting a routing tag set in the header of a cell transferred through the ATM switch 143 to the predetermined output route information (VPI, VCI and TAGD) of an outgoing side line and converting the header of the cell from the routing tag to the output route information, and also comprises a function of multiplexing the cell with the converted header and mapping the cell according to the format of the physical layer of the line, etc. The TAGD in the output route information, for example, is deleted by an interface, not shown in the diagram, provided after the VPI/VCI/TAGD converter unit 142a in the outgoing line correspondence unit 142. The cell with the deleted output route information is converted to the 53 bytes of an ATM cell and is then multiplexed.

The ATM switch 143 comprises a function of, when a cell is inputted from the incoming line correspondence unit 141, routing the cell to the outgoing line correspondence unit 142 for a predetermined direction by referring to the routing tag set in the header.

A central control unit 144 comprises a function of controlling the whole system by executing programs stored in a memory, not shown in the diagram.

Information needed for the header converter unit 141a to perform a header conversion is information on the correspondence between the effective bits of VPI, VCI and TAGD set in the header of an input cell and a routing tag as described above, and the information needed for the VPI/VCI/TAGD converter unit 142a to perform a header conversion is information on the correspondence between the routing tag set in the header of a cell inputted from the ATM switch 143 and the VPI, VCI and TAGD on the interface side of the outgoing line for the cell. These correspondences are set in the header converter unit 141a and the VPI/VCI/TAGD converter unit 142a according to instructions from the central control unit 144 when the central control unit 144 establishes an ATM connection, and are cancelled in the header converter unit 141a and the VPI/VCI/TAGD converter unit 142a according to instructions from the central control unit 144 when the central control unit 144 cancels the connection in the same way.

The setting and cancellation of the ATM connection are dynamically made according to the instruction or request of a subscriber, or a member of office or maintenance personnel, etc., under the control of the central control unit 144.

Figure 10:
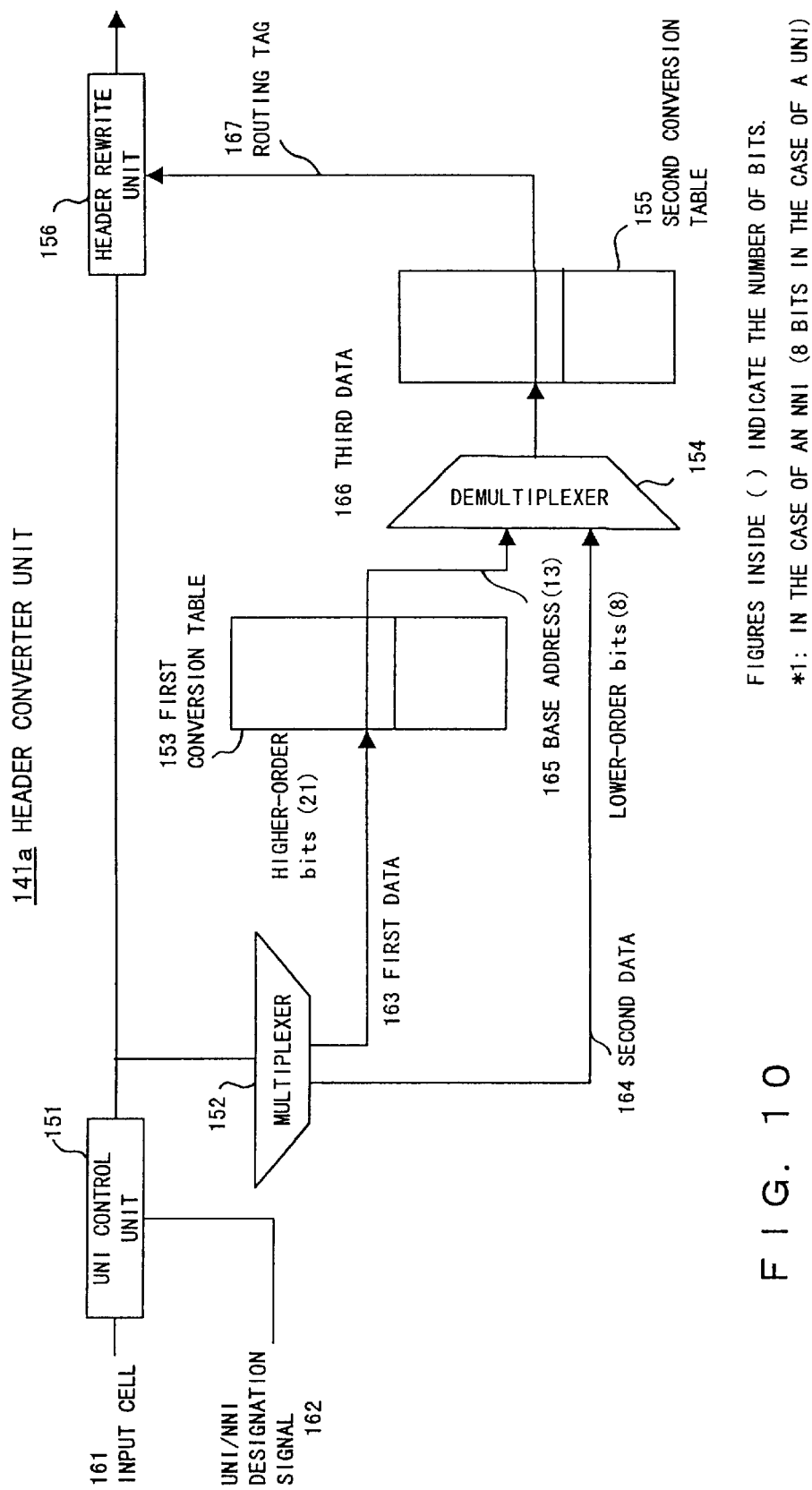
FIG. 10 shows a whole configuration of the header converter unit of the incoming line correspondence unit shown in FIG. 9.
Figure 11:
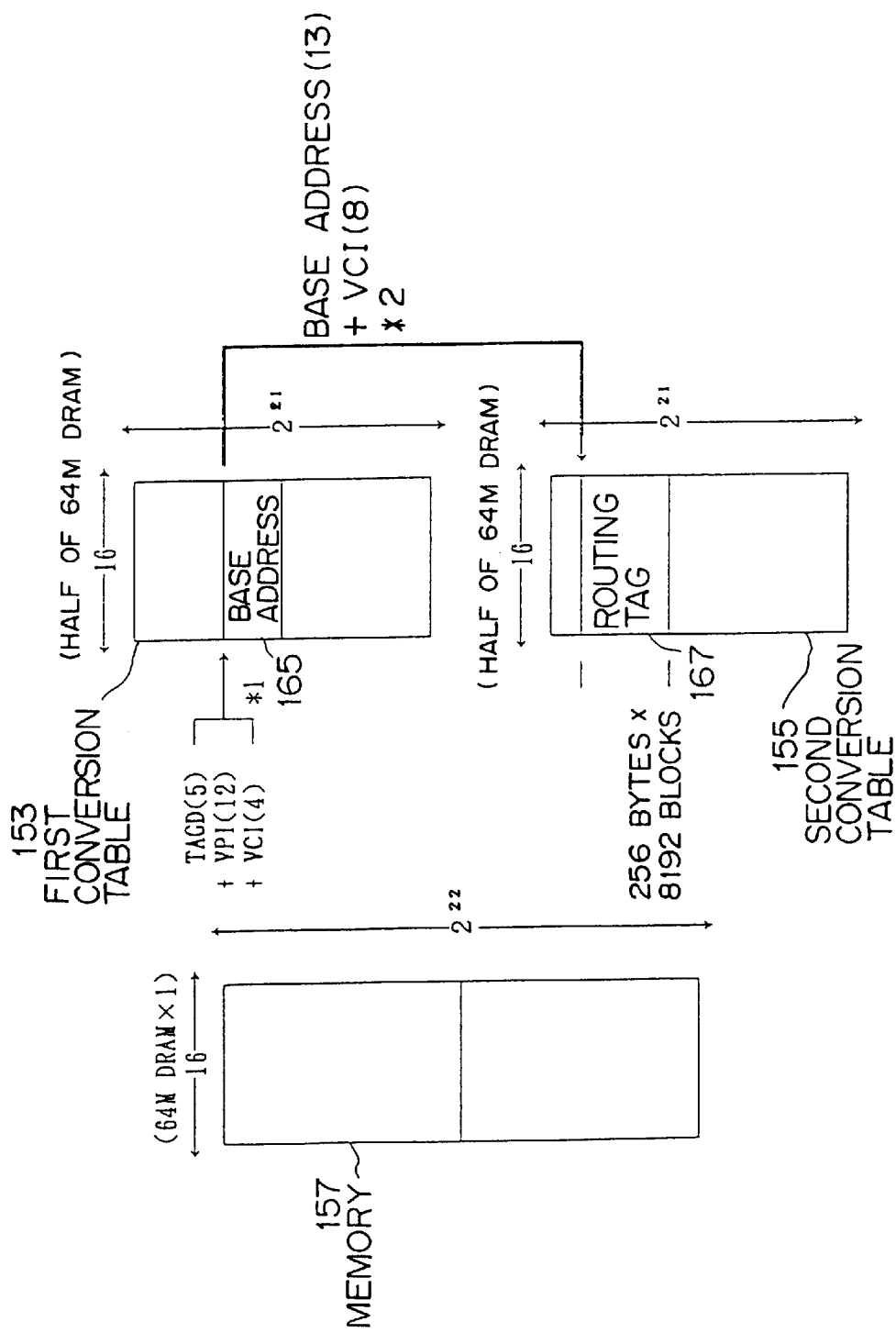
FIG. 11 shows detailed configurations of the first and second conversion tables shown in FIG. 10.
Figure 12:
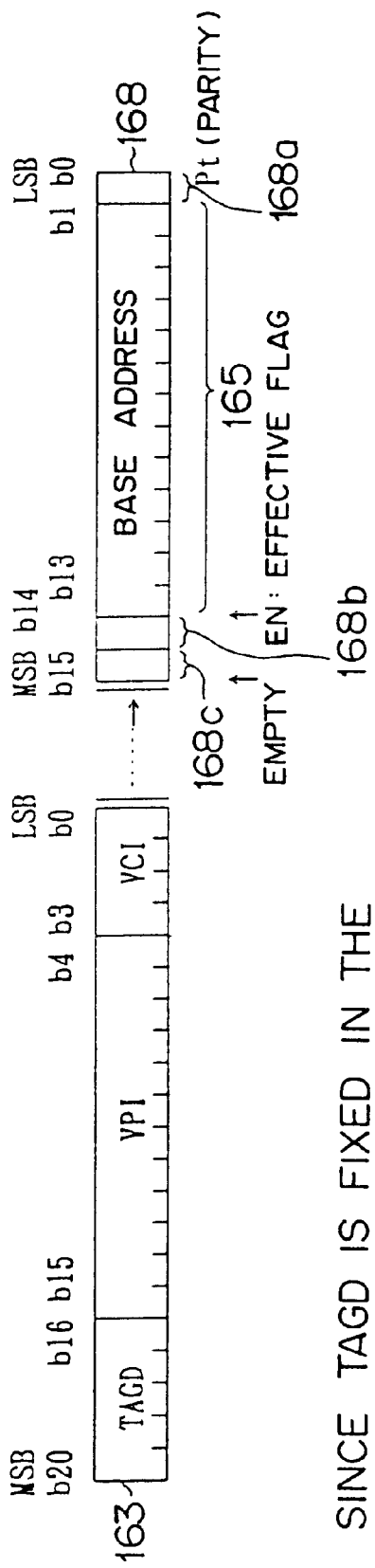
FIG. 12 shows both data on the address of the first conversion table shown in FIG. 11 and data stored in the entry.
Figure 13:
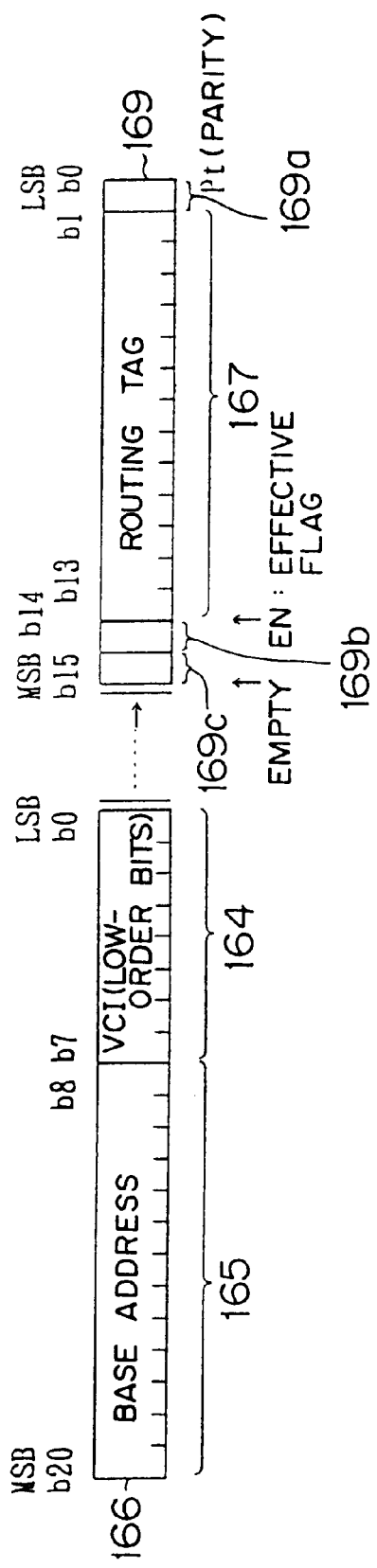
FIG. 13 shows both data on the address of the second conversion table shown in FIG. 11 and data stored in the entry.
Figure 14:
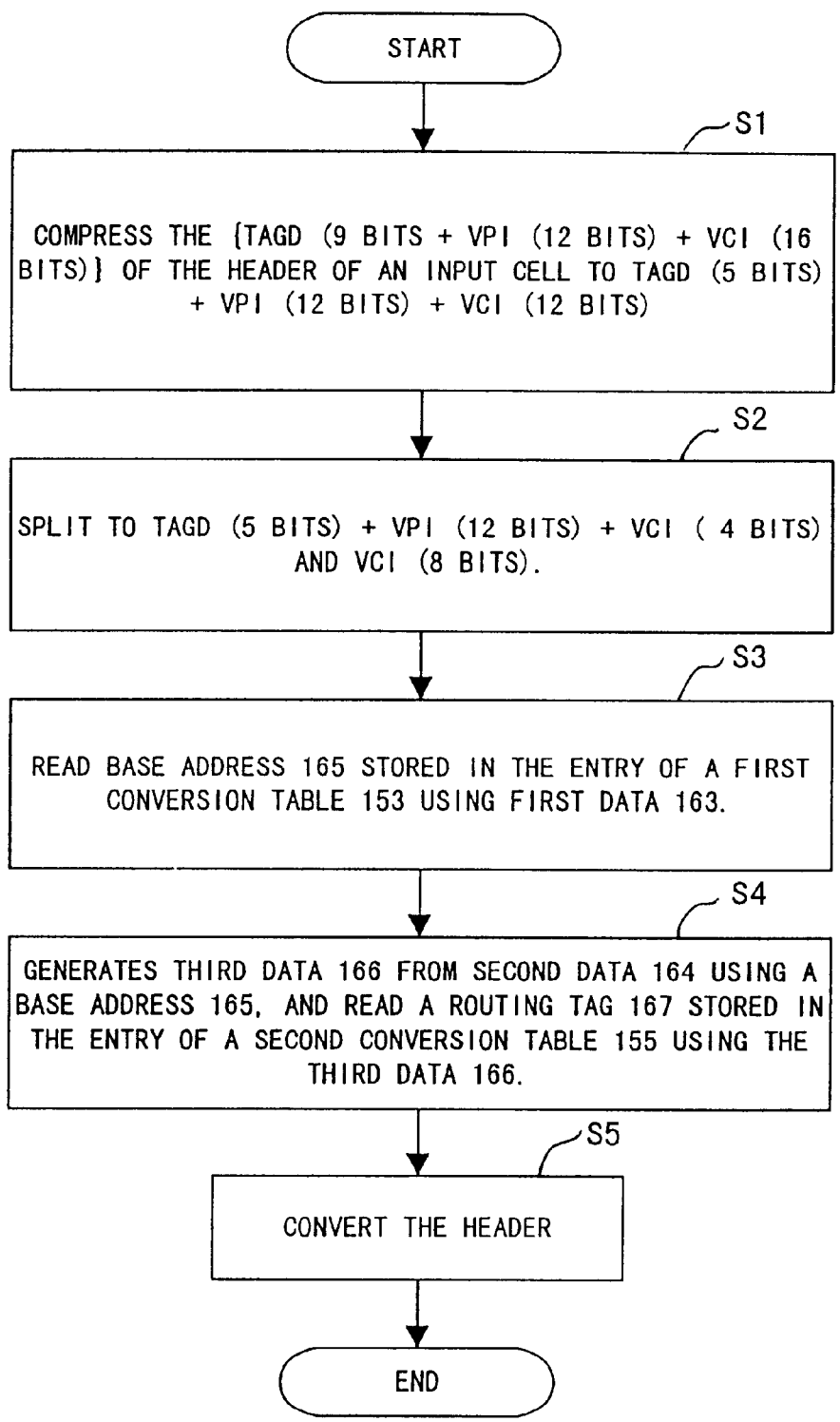
FIG. 14 is a flowchart explaining the operational flow of the header converter unit shown in FIG. 10.

FIG. 10 shows the whole configuration of the header converter unit 141a of the incoming line correspondence unit 141. FIG. 11 shows detailed configurations of the first and second conversion tables 153 and 155 shown in FIG. 10. FIG. 12 shows both the data on the address of the first conversion table 153 shown in FIG. 11 and the data stored in the entry. FIG. 13 shows both the data on the address of the second conversion table 155 shown in FIG. 11 and the data stored in the entry. FIG. 14 is a flowchart explaining the operational flow of the header converter unit 141a shown in FIG. 10.

The case where the input route information of the header of an input cell 161 is converted to 13 bits of a routing tag in the input cell 161 with header information of the effective bits of the 29 bits in total consisting of 12 bits of the VPI effective bit, the 12 lower-order bits of the VCI effective bit and the 5 lower-order bits of the TAGD effective bit included in the maximum 37 bits of input route information consisting of VPI (12 bits), VCI (16 bits) and TAGD (9 bits) using a one-chip DRAM of 64 Mbits with a 16-bits width and $2^{22}$-words depth, is described below with reference to these diagrams. The DRAM of 64 Mbits is logically split into two memories of 16-bits width×$2^{21}$-words depth, and both the first conversion table 153 and the second conversion table 155 are configured in each of the memories. Of course, 2 DRAMs of 32 Mbits each of which has 16-bit width can also be used. In this case, although the circuit scale become large, a header conversion can be performed at a higher speed. The routing tag is made to be 13 bits, for example, and can also be made 12 bits, 14 bits, etc. However, when the header conversion is performed at a high speed, the number of bits of a routing tag is restricted by the bit width of a DRAM chip. The number of bits of VPI, VCI and TAGD are given as examples, and are not limited to these values.

As shown in FIG. 10, when an input cell 161 is inputted, a UNI control unit 151 judges based on a UNI/NNI designation signal 162 inputted from the central control unit 144, whether the input cell 161 is inputted through a UNI or NNI. If the cell is inputted through the UNI, the UNI control unit 151 overwrites the 4 bits of the GFC (Generic Flow Control: flow control between a terminal (user) and a network) area of the header of the input cell with "0". If the cell is inputted through the NNI, the UNI control unit 151 does nothing, since an area corresponding to the GFC area of the header of the input cell 161 is used as an area for VPI. Furthermore, the UNI control unit 151 outputs the input cell 161 to a header rewrite unit 156, extracts 37 bits of input route information (input route information after rewriting a GFC area to "0" when the input cell 161 is inputted through a UNI) from the header of the input cell 161, and outputs the input route information to a multiplexer 152.

The multiplexer 152 compresses (converts) 37 bits in total of input route information inputted from the UNI control unit 151 to be 29 bits of effective bits, and splits the compressed effective bits consisting of VPI, VCI and TAGD (in this embodiment, a VPI is not compressed) into 21 bits of first data 163 used as the entry address for the first conversion table 153, and 8 bits of second data 164 used as a part of the entry address for the second conversion table 155, and outputs the first data 163 to the first conversion table 153 as an entry address signal and the second data 164 to a demultiplexer 154.

The first conversion table 153 stores 13 bits of a base address 165 in each entry.

The demultiplexer 154 generates 21 bits of third data 166 with 13 bits of the base address 165 inputted from the first conversion table 153 as the higher-order bits of the entry address for the second conversion table 155 and 8 bits of the second data 164 inputted from the multiplexer 152 as the lower-order bits of the entry address for the second conversion table 155, and outputs the third data 166 to the second conversion table 155 as an entry address signal.

The second conversion table 155 stores 13 bits of a routing tag 167 in each entry.

The header rewrite unit 156 rewrites the input route information (VPI, VCI and TAGD) of the input cell 161 inputted from the UNI control unit 151 to the routing tag 167 inputted from the second conversion table 155, and outputs the cell with the converted route information in the header to the ATM switch 143 shown in FIG. 9. The operation timing of a multiplexer 152, the first conversion table 153, a demultiplexer 154 and the second conversion table 155, all of which are shown in FIG. 10, for example, are controlled by the header rewrite unit 156. In addition to the operation timing control, the operation timing of the header rewrite unit 156 can also controlled by a timing control circuit, not shown in the diagram.

The memory 157 shown in FIG. 11 is a one-chip DRAM of 64 Mbits with a 16-bits width×a $2^{22}$ words depth and is logically split equally into two, and the first conversion table 153 and the second conversion table 155 are mounted in each part. Both the first and second conversion tables 153 and 155 have the same size as a DRAM with a 16-bits width×a $2^{21}$ words depth.

The first conversion table 153 inputs 21 bits of the first data 163 shown on the left side of FIG. 12 as each entry address. In each entry 16 bits of data 168 including the base address 165 shown on the right side of FIG. 12 are stored. In the first data 163, 4 higher-order bits out of 12 bits of a VCI effective bits, 12 bits of VPI and 5 bits of TAGD are assigned to bits 0 through 3, bits 4 through 15 and bits 16 through 20, respectively. In this way, in the first data 163, 5 bits of TAGD effective bits are assigned as higher-order bits. On the other hand, in the data 168, 13 bits of a base address 165, a parity bit 168a and an effective flag (EN) 168b are assigned to bits 1 through 13, bit 0 and bit 14, respectively.

Bit 15 is an unused empty bit 168c. The effective flag 168b is a bit for indicating whether or not the base address 165 in the same data 168 is effective, of which "1" and "0" indicate to be effective and to be ineffective, respectively. This effective flag 168b is set by the central control unit 144 when the central control unit 144 establishes and cancels an ATM connection. That is, the effective flag 168b is set to "1" and "0" when the ATM connection is established and cancelled, respectively.

The second conversion table 155 inputs 21 bits of third data 166 shown on the left side of FIG. 13 as each entry address. In each entry 16 bits of data 169 including the routing tag 167 shown on the right side of FIG. 13 are stored. In the third data 166, 8 bits of second data 164 (8 lower-order bits of a VCI effective bit) and 13 bits of a base address 165 are assigned to bits 0 through 7 and bits 8 through 20, respectively. On the other hand, in the data 169, 13 bits of a routing tag 167, a parity bit 169a and an effective flag (EF) 169b are assigned to bits 1 through 13, a bit 0 and a bit 14, respectively. Bit 15 is an unused empty bit 169c. This effective flag 169b is set by the central control unit 144 when the central control unit 144 establishes and cancels an ATM connection. That is, the effective flag 168b is set to "1" and "0" when the ATM connection is established and cancelled, respectively.

It is assumed below that a cell 161 is inputted to the UNI control unit 151 through an NNI.

Next, the operations of the header converter unit 141a with the above configuration are described below with reference to the flowchart shown in FIG. 14.

In step S1, a total of 37 bits of input route information consisting of 12 bits of VPI, 16 bits of VCI and 9 bits of TAGD are compressed to 29 bits of a bit string consisting of the 5 lower-order bits of TAGD, 12 bits of VPI and the 12 lower-order bits of VCI, by a multiplexer 152, to generate the first data 163 and second data 164. This number of 29 bits is calculated using the equation 2(Y−1)−Z={the number of the effective bits (a+b+c) of VPI, VCI and TAGD of an input cell when the number of compressed bits becomes a minimum}. That is, since in this embodiment Y=22 and Z=13, the number is 2×(22−1)−13 =29. Although each of the effective bit lengths of VPI, VCI and TAGD can be variable, unless the total effective bit length of VPI, VCI and TAGD is 29 bits, the length of the effective bits of TAGD has to be fixed. When the input route information is converted to 12 bits of a base address by the first conversion table of another aspect of the present embodiment, {the number of the effective bits (a+b+c) of VPI, VCI and TAGD of an input cell when the number of compressed bits becomes a minimum} becomes 30 bits.

In step S2, 29 bits of the effective bits of input route information obtained by the compression are split into the first data 163 consisting of 21 bits of a bit string of the 5 lower-order bits of TAGD, 12 bits of VPI and 4 higher-order bits out of the 12 lower-order bits of VCI, and the second data 164 consisting of the remaining 8 bits on the LSB side out of the 12 bits of the effective bits of VCI. The reason why the number of bits of the former is 21 is because the entry number of the first conversion table 153 is $2^{21}$. Here, 29 bits of the effective bits of input route information obtained by the compression have to be split so that a TAGD can be included on the MSB (Most Significant Bit) side of the first data used to access the entry of the first conversion table. This is because the first data 163 become unique values according to a TAGD value, that is, because a header conversion is performed in the same PWCB so that even if the combined value of {the effective bits of VPI and the effective bits of VCI} becomes the same value between a plurality of cells inputted from a plurality of interfaces in which a VP connection is simultaneously established, a routing tag 167 set in the header of each of the cells can be unique. In this embodiment VPI is assumed not to be compressed, and all cells with a VPI value set for a VP service are designed to be correctly converted to the same routing tag 167.

In step S3, the corresponding entry of the first conversion table 153 is accessed using the first data 163 consisting of 21 bits of the bit string obtained in step S2 as address signals, and a base address 165 consisting of 13 bits are read from the entry. The number of bits of the base address is assumed to be 13 for consideration of system requirements, and can also be 12 and so forth.

In step S4, third data 166 consisting of 21 bits of a bit string with 13 bits of the base address 165 obtained in step S3 and 8 bits of the second data 164 obtained in step S2 as higher-order bits and lower-order bits, respectively, are generated by the demultiplexer 154, the corresponding entry of the second conversion table 155 is accessed using these third data 166, a routing tag 167 consisting of 13 bits is read from the entry, and the routing tag 167 is outputted to the header rewrite unit 156.

In step S5, the route information of a cell inputted from a UNI control unit 151 is rewritten to 13 bits of the routing tag 167 obtained from the input route information (VPI, VCI and TAGD) in step S4, and the cell with the converted header of route information is outputted to the ATM switch 143 shown in FIG. 9.

In this way, the header converter unit 141a of this embodiment extracts 37 bits of input route information consisting of 12 bits of VPI, 16 bits of VCI and 9 bits of TAGD from the header of the input cell 161, then compressed the 37 bits of this input route information to a total of 29 bits of input route information including 12 bits of VPI, the 12 lower-order bits of VCI and the 5 lower-order bits of TAGD, then converts this effective bit of input route information consisting of 29 bits to 13 bits of the routing tag 167, converts the header of the route information of the input cell 161 from 37 bits of the input route information to 13 bits of the routing tag 167, and outputs the cell with the converted header of the route information to the ATM switch 143.

When the route information of the header of an input cell 161 is inputted through a UNI, by overwriting 4 bits of the GFC area of the header with "0" the route information of the header can be converted in the same process as an input cell 161 inputted through an NNI.

Since in the case the routing tag 167 is 13 bits, the maximum number of the convertible combination of VPI, VCi and TAGD is $2^{13}=8192$.

In the embodiment the number of bits of the base address 165 and the routing tag 167 are made the same in consideration of a VP service, and in this case the system can be configured so that instead of the two conversion tables 153 and 155, only one conversion table 153 is referred to. In a configuration like this, all cells with a VPI value set for a VPI service are converted to routing tags with the same value using the first conversion table 153. That is, in this case, when an ATM connection is established, the routing tag value is set for the entry base address of the first conversion table 153 of which the address is the first data 163 of a cell with the VPI value.

Although the registration and deletion of an ATM connection are not completed within an one-cell passage time, the registration and deletion are completed within a certain time with no practical problem. Since a specific time for the registration and deletion depends on the performance of a memory chip used, the detailed configuration of the operation clock of a circuit, etc., and the specific time for the registration and deletion are omitted here.

As described so far, in this embodiment, by converting the route information of the header of an input cell 161 using the first and second conversion tables a high-speed header conversion process is available without a large capacity memory which was the problem in the conventional header conversion method using a simple table being the first prior art, and a long process time which was the problem in the conventional method using a matching process by a CAM as the second prior art.

By setting TAGD in a higher-order bit than the combination of VPI and VCI, that is, on the MSB side of the first data 163 for accessing the entry of the first conversion table and fixing the bit length of TAGD, the route information of the headers of the plurality of input cells 161 can be correctly converted, even if the combined values of the VPI values and VCI values set in the headers of a plurality of input cells inputted from a plurality of lines in the same PWCB are the same.

For example, a part of the function of the UNI control unit 151 and header rewrite unit 156 can also performed by way of firmware or software.

FIG. 15 shows a configuration of a computer 180 for implementing the cell header conversion method of the embodiment of the present invention. The computer 180 comprises a CPU (Central Processing Unit) 181, a memory 182 such as a ROM (Read Only Memory), RAM (Random-Access Memory), etc., an external storage unit 183, a medium driver unit 184, a portable storage medium 185 and a network connector unit 186 being a network interface connected to a network 188, all connected by a bus 187.

Program data 189 written in the software program code, for implementing the embodiment, for example, are down-loaded to the external storage unit 183 through the network 188 and network connector unit 186, and further are down-loaded to the portable storage medium 185 through the medium driver unit 184.

The CPU 181 executes the program data 189 loaded to the memory 182 from the external storage unit 183 or from the portable storage medium 185 through the medium driver unit 184, converts the input route information (VPI, VCI and TAGD) set in the header of an input cell 161 to a routing tag 167, and rewrites the route information set in the header of the input cell 161 from the input route information to the routing tag 167.

Instead of being down-loaded to the external storage unit 183 or the portable storage medium 185 through a network 188 as described above, the program data 189 can also stored in advance in the external storage unit 183 or the portable storage medium 185.

In this case, the program data 189 themselves implement the new function of the embodiment of the present invention, and the external storage unit 183, the memory 182 for storing the program data 189 and the portable storage medium 185 also compose the embodiment of the present invention.

For the portable storage medium 185, for example, a floppy disk, hard disk, an optical disk, a magneto-optic disk, a CD-ROM, a CD-R, a DVD, a magnetic tape, a non-volatile memory card, a ROM card, etc. are used.

Although the embodiments are described using an ATM cell, the present invention is not limited to an ATM cell, and can apply to the conversion of the route information of the multiline-correspondent header of all cells (including packets, frames, etc.) used in communications by way of cell relay.

Furthermore, the present invention can apply to the case where input route information (TAGD, VPI and VCI) are converted to output route information (TAGD, VPI and VCI). In this case, for example, two steps of conversion tables as shown in the embodiments or three or more steps of multilevel conversion tables can also used. In this way, the present invention is not limited to a configuration using two steps of conversion tables, and by configuring using three steps of multilevel conversion tables, embodiments for converting the route information of the header of a multiline-correspondent cell are also included.

As described above, according to the present invention, the header conversion of a multiline-correspondent cell is available using a memory with a small capacity and at a high speed.

According to the present invention, since a circuit configuration can be made simple, an inexpensive and reliable multiline-correspondent cell header conversion apparatus can be provided.

According to the present invention, since some of the functions which are conventionally implemented by way of hardware can be implemented by way of firmware or software, a flexible configuration is available according to the requirements of a system.

While the present invention has been described with reference to the preferred embodiments thereof, various modifications and changes may be made by those skilled in the art without departing from the true spirit and scope of the invention as defined by the claims thereof.

What is claimed is:

1. A multiline-correspondent cell header conversion apparatus for converting the header of a cell in which a plurality of lines are multiplexed, comprising:

a first table for matching a first data of a first route information set in the pre-conversion header of said cell with a specific corresponding data out of a plurality of corresponding data;

a second table for matching a third data obtained from both a second data of said first route information and said specific corresponding data with a second route information set in the post-conversion header of said cell;

header converting means for converting the route information set in said cell from said first route information to said second route information referring to both said first table and said second table; and controlling means for dynamically setting up and cancelling the correspondence between the first data of the first route information set in the pre-conversion header of said cell in said first table and said specific correspondence data, and dynamically setting up and cancelling the correspondence between the third data in said second table and the second route information set in the post-conversion header of said cell.

2. The multiline-correspondent cell header conversion apparatus according to claim 1, wherein said header converting means comprising:

header extracting means for extracting said first route information from the pre-conversion header of said cell, outputting the first data of said first route information as the first entry address of said first table and outputting the second data of said first route information as a first bit string composing the second entry address of said second table; and header rewriting means for accessing said first table using said first entry address of said first table and reading said specific corresponding data from said first table, accessing said second table by outputting the corresponding data as a second bit string composing the second entry address of said second table and reading said second route information, and rewriting said first route information set in the header of said cell to said second route information.

3. The multiline-correspondent cell header conversion apparatus according to claim 1, wherein said controlling means restricts the number of said specific corresponding data matched by the first data of said first route information in said first table to a predetermined number or less.

4. The multiline-correspondent cell header conversion apparatus according to claim 1, wherein said first table inputs a first bit string consisting of a part or all of bit strings in each bit area of a line identifier, a virtual path identifier and a virtual channel identifier set in the pre-conversion header of said cell as the first entry address of said first table, and stores said specific corresponding data becoming a part of a second bit string composing the second entry address of said second table in said first entry, and said second table inputs said second bit string consisting of both the remaining third bit string not used as the first entry address of said first table out of bit strings in each bit area of a line identifier, a virtual path identifier and a virtual channel identifier set in the pre-conversion header of said cell and said fourth bit string consisting of said specific corresponding data read from said first table as said second entry address, and stores said second routine information set in the post-conversion header of said cell in said second entry.

5. The multiline-correspondent cell header conversion apparatus according to claim 4, wherein the bit string of said line identifier is fixed to a predetermined bit area of said first bit string becoming the first entry address of said first table.

6. The multiline-correspondent cell header conversion apparatus according to claim 5, wherein the total bit length of the bit strings of said virtual path identifier and said virtual channel identifier in said first bit string becoming the first entry address of said first table equals the bit length of bit areas other than said predetermined bit area of said first bit string, and the bit length of each bit string of said virtual path identifier and said virtual channel identifier in said first bit string can be set variably for each line.

7. A multiline-correspondent cell header conversion apparatus, comprising:

first converting means for converting a part of the first route information with at least a virtual path identifier, a virtual channel identifier, and a line identifier set in the header of a multiline-correspondent cell to the first route conversion information with a lower number of bits; and second converting means for converting the second route conversion information in which a part or all of the remaining information not used for the conversion of said first route information by said first converting means are added to said first route conversion information obtained by said first converting means, to the second route information corresponding to the first route information of said cell.

8. The multiline-correspondent cell header conversion apparatus according to claim 7, further comprising header rewriting means for rewriting the route information of the header of said cell from said first route information to said second route information obtained by said second converting means.

9. The multiline-correspondent cell header conversion apparatus according to claim 7, wherein the number of bits of said second route information is less than that of said first route information used as information to be converted of both said first converting means and said second converting means.

10. The multiline-correspondent cell header conversion apparatus according to claim 7, wherein said second route information is a routing tag.

11. A multiline-correspondent cell header conversion method for converting the header of a cell in which a plurality of lines are multiplexed, comprising:

a table setting step of dynamically setting a first table for matching a first data of a first route information set in the pre-conversion header of said cell with a specific corresponding data out of a plurality of corresponding data, and dynamically setting a second table for matching a third data obtained from both a second data of said first route information and said specific corresponding data a second route information set in the post-conversion header of said cell;

a header converting step of converting route information set in the header of said cell from said first route information to said second route information by referring to both said first table and said second table; and a table cancelling step of dynamically cancelling correspondence between the first data of first route information set in the pre-conversion header of said cell in said first table and said specific corresponding data, and dynamically cancelling correspondence between said third data in said second table and second route information set in the post-conversion header of said cell.

12. The multiline-correspondent cell header conversion method according to claim 11, wherein said header converting step further comprising:

a header extracting step of extracting said first route information from the pre-conversion header of said cell, outputting the first data of said first route information as the first entry address of said first table, and outputting the second data of said first route information as a first bit string composing the second entry address of said second table; and a header rewriting step of accessing said first table using said first entry address of said first table and reading said specific corresponding data from said first table, accessing said second table by outputting the corresponding data as a second bit string composing the second entry address of said second table, reading said second route information, and rewriting said first route information set in the header of said cell to said route information.

13. A multiline-correspondent cell header conversion method, comprising:

a first converting step of converting a part of first route information with at least a virtual path identifier, a virtual channel identifier and a line identifier set in the header of a multiline-correspondent cell to first route conversion information with a lower number of bits; and a second converting step of converting the second route conversion information in which a part or all of the remaining information not used for the conversion of said first route information in said first converting step are added to said first route conversion information obtained in said first converting step, to the second route information corresponding to the first route information of said cell.

14. The multiline-correspondent cell header conversion method according to claim 13, further comprising:

a header rewriting step of rewriting the route information of the header of said cell from said first route information to said second route information obtained by said second converting step.

15. The multiline-correspondent cell header conversion method according to claim 13, wherein the number of bits of said second route information is less than that of said first route information.

16. The multiline-correspondent cell header conversion method according to claim 13, wherein said second route information is a routing tag.

17. A computer-readable storage medium storing a program which enables a computer to perform the processes of:

a first converting step of converting a part of first route information with at least a virtual path identifier, a virtual channel identifier and a line identifier set in the header of a multiline-correspondent cell to first route conversion information with a lower number of bits; and a second converting step of converting the second route conversion information in which a part or all of the remaining information not used for the conversion of said first route information in said first converting step are added to said first route conversion information obtained in said first converting step, to the second route information corresponding to the first route information of said cell.

18. The computer-readable storage medium according to claim 17, storing a program which enables a computer to further perform the process of:

a header rewriting step of rewriting the route information of the header of said cell from said first route information to said second route information obtained in said second converting step.

19. The computer-readable storage medium according to claim 17, wherein the number of bits of said second route information is less than that of said first route information.

20. The computer-readable storage medium according to claim 17, wherein said second route information is a routing tag.

\* \* \* \* \*